(12) United States Patent  
Fischer et al.

(10) Patent No.: US 9,808,948 B2  
(45) Date of Patent: Nov. 7, 2017

(54) FOOD CHOPPER

(71) Applicant: LEIFHEIT AG, Naussau/Lahn (DE)

(72) Inventors: Klaus-Juergen Fischer, Holzappel (DE); Markus Klotz, Hainau (DE)

(73) Assignee: LEIFHEIT AG, Nassau/Lahn (DE)

( * ) Notice: Subject to any disclaimer, the term of this patent is extended or adjusted under 35 U.S.C. 154(b) by 0 days.

(21) Appl. No.: 14/440,390

(22) PCT Filed: Oct. 31, 2013

(86) PCT No.: PCT/EP2013/072849  
§ 371 (c)(1),  
(2) Date: May 4, 2015

(87) PCT Pub. No.: WO2014/068076  
PCT Pub. Date: May 8, 2014

(65) Prior Publication Data  
US 2015/0283719 A1    Oct. 8, 2015

(30) Foreign Application Priority Data  
Nov. 2, 2012    (DE) .................. 10 2012 110 521

(51) Int. Cl.
  *B26D 3/20* (2006.01)
  *B26D 3/26* (2006.01)
  *A47J 43/044* (2006.01)

(52) U.S. Cl.
  CPC .............. *B26D 3/20* (2013.01); *A47J 43/044* (2013.01); *B26D 3/26* (2013.01); *A47J 2043/04427* (2013.01)

(58) Field of Classification Search
  CPC ........ B26D 3/20; B26D 43/044; B26D 42/34; B26D 3/26; B26D 2003/287;
  (Continued)

(56) References Cited

U.S. PATENT DOCUMENTS 2,683,566 A * 7/1954 Bentley .................. A47J 42/34
                                                        222/510
3,073,579 A    1/1963 Detrick
                    (Continued)

FOREIGN PATENT DOCUMENTS

DE    WO 2008000205 A1 *  1/2008    ............... B26D 3/26
EP               1576916 A2    9/2005

OTHER PUBLICATIONS

Blixer 6 V—WebstaurantStore Close Up.*
Blixer 6 V—Robot Coupe 2010 date.*

*Primary Examiner* — R. K. Arundale  
*Assistant Examiner* — Joseph Finan, Jr.  
(74) *Attorney, Agent, or Firm* — Leydig, Voit & Mayer, Ltd (57) ABSTRACT

A food chopper includes a housing and a chopping blade assembly disposed therein. The chopping blade assembly is held and guided in a guide of the housing so as to be movable to-and-fro along an operating direction counter to a force of a return spring in such a manner that the chopping blade assembly, during movement along the operating direction, is forcibly rotated and held in the upper rest position by the return spring and, in order to chop the food, is movable from the upper rest position downward against a counterbearing face. A scraper element is rotationally driven by rotational movement of the chopping blade assembly and has a scraper edge having an elastic lip which is configured, during the rotational movement of the scraper element, to bear on an inner side of a side wall of the housing.

19 Claims, 5 Drawing Sheets

(58) Field of Classification Search
CPC ...... B26D 2003/288; B26D 7/00; B26D 1/06; B26D 1/44; B26D 7/0006; B02C 18/00; B02C 18/02; A47J 2043/04427
USPC .................... 241/166, 169, 199.11, 272, 283
See application file for complete search history.

(56) References Cited

U.S. PATENT DOCUMENTS

| | | | | |
|---|---|---|---|---|
| 3,313,332 | A * | 4/1967 | Otto | A47J 43/046 241/101.8 |
| 3,933,315 | A | 1/1976 | Popeil | |
| 5,535,665 | A | 7/1996 | Wong | |
| 6,244,529 | B1 | 6/2001 | Tardif et al. | |
| 6,585,179 | B2 * | 7/2003 | Weibel | B26D 7/00 241/169 |
| 7,100,854 | B2 * | 9/2006 | Aby-Eva | B26D 3/26 241/169 |
| 7,314,308 | B2 * | 1/2008 | Fallowes | A47J 43/0711 366/310 |
| 2004/0217220 | A1 | 11/2004 | Bitonto et al. | |
| 2005/0205704 | A1 * | 9/2005 | Yurchenco | A47J 43/044 241/169 |
| 2009/0166369 | A1 * | 7/2009 | Savicki | B65D 43/0218 220/781 |
| 2011/0174908 | A1 | 7/2011 | Curtin | |
| 2012/0123459 | A1 * | 5/2012 | Ruf | A61B 5/1411 606/182 |
| 2014/0299701 | A1 * | 10/2014 | Zakowski | A47J 43/0716 241/166 |

* cited by examiner

FOOD CHOPPER

CROSS-REFERENCE TO PRIOR APPLICATIONS

This application is a U.S. National Stage Application under 35 U.S.C. §371 of International Application No. PCT/EP2013/072849 filed on Oct. 31, 2013, and claims benefit to German Patent Application No. DE 10 2012 110 521.9 filed on Nov. 2, 2012. The International Application was published in German on May 8, 2014 as WO 2014/068076 A2 under PCT Article 21(2).

FIELD

The invention relates to a food chopper having a housing, a chopping blade assembly which is disposed in the housing and which is held and guided in a guide of the housing so as to be movable to-and-fro along an operating direction counter to the force of a return spring in such a manner that the chopping blade assembly during the movement along the operating direction is forcibly rotated and held in an upper rest position by the return spring and, in order to chop the food, is movable from the rest position downward against a counter-bearing face, and having a tappet for depressing the chopping blade assembly, which has a hand rest and which interacts with the chopping blade assembly and protrudes from the housing.

BACKGROUND

In an embodiment of a food chopper from EP 1 576 916 A2, the housing has an upper receptacle space for receiving the chopping blade assembly in the rest position, and a lower operating space, which is delimited by a side wall, for receiving the food to be chopped, and at least one scraper element is provided which, driven by the rotation movement of the chopping blade assembly, by way of a scraper edge is moved along the inner side of the side wall of the operating space.

The known food chopper does have the advantage that it is already quite capable of avoiding the situation where non-chopped or only insufficiently chopped parts of the food adhere to the side wall of the operating space and are thus not further processed; however, there is the risk that comparatively small pieces of the food are jammed between the scraper element and the inner side wall of the operating space. In particular following comparatively long use, the scraper elements may moreover also be deformed, which may arise in particular due to the influence of hot rinsing water or of mechanical forces after the food chopper has been disassembled. In this case, the gap between the side wall and the scraper element is enlarged, such that the scraping function increasingly deteriorates.

SUMMARY

In an embodiment, the present invention provides a food chopper including a housing having a guide, an upper receptacle space and a lower operating space that is delimited by a side wall and is configured to receive food to be chopped. A chopping blade assembly is disposed in the housing. The chopping blade assembly is configured to be disposed, in an upper rest position, in the upper receptacle space of the housing. The chopping blade assembly is held and guided in the guide of the housing so as to be movable to-and-fro along an operating direction counter to a force of a return spring in such a manner that the chopping blade assembly, during movement along the operating direction, is forcibly rotated and held in the upper rest position by the return spring and, in order to chop the food, is movable from the upper rest position downward against a counter-bearing face. A tappet protrudes from the housing and is configured to depress the chopping blade assembly. The tappet has a hand rest and interacts with the chopping blade assembly. At least one scraper element is configured to be driven by rotational movement of the chopping blade assembly such that a scraper edge of the at least one scraper element is moved along an inner side of the side wall of the lower operating space, the scraper edge having an elastic lip which is configured, during rotational movement of the scraper element, to bear on the inner side of the side wall.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a food chopper in which the functioning of the scraper element is improved.

In an embodiment, the scraper edge has an elastic lip which, during the rotational movement of the scraper element, bears on the inner side of the side wall.

A further problem of the known food choppers recognized by the inventors lies in the fact that a jolt which is unpleasant for the user occurs when the chopping blade assembly reaches the counter-bearing face. On the one hand, the user has to depress the tappet using a certain force in order that the last fibers of the food can also be severed by the chopping operation, while on the other hand the jolt on the wrist or on the palm of the hand is often perceived as being unpleasant. Moreover, exceeding a certain force also contributes toward the blade either being forcibly pressed into the counter-bearing face and/or the cutting edge of the chopping blade being damaged or blunted.

In another embodiment, the invention provides a food chopper of which the stroke movement is more comfortable and is associated with less wear of the chopping blade.

The achievement of this additional function may also find an application in other known food choppers and may be independent from or useable with the embodiment in which the elastic lip of the scraper element bears on the inner side of the side wall.

In an embodiment, a food chopper is optimized such that in the storage state, that is to say when the tappet is depressed and is held by way of a locking feature, the food chopper requires as little space as possible. This embodiment can likewise be independent of the features of the embodiments described above or useable in combination with those features.

In an embodiment, the present invention optimizes the locking feature of the known food chopper as described at the outset such that the complex delinking of the rotation movement from the stroke movement, as is included in the known food chopper, is dispensed with.

Initially, in respect of the first-mentioned embodiment, the new food chopper offers an improved scraper function, since henceforth the scraper elements which bear in the manner of a usual wiping element, for example of a squeegee, on the inner side of the side wall of the operating space and are forcibly moved in a radial manner along this side wall as the scraper edge have the elastic lip.

In the case of the usual food choppers, the chopping blade assembly is rotated about an angle of a few degrees, either during the downward movement or else during the upward movement or between these two movements. This is generally known and is utilized in order to prevent the knife blades always impinging on the same spot of the food and thus not effectively comminuting the pieces.

Now, as is the case in the generic food choppers, this rotation movement is utilized in order to loosen such parts of the food which adhere to the side wall from said side wall and to convey them back into the central region of the operating space, such that they, together with the other parts of the food, there may be processed to a uniform size which is as small as possible.

Preferably, the scraper elements here are so long that they extend up to a short distance from the counter-bearing face. Since the scraper elements are rotated, in addition to the abovementioned loosening function for particles adhering to the side wall they may also assume the function of a guide wing which conveys particles which migrate outward back into the interior of the operating space. To this end, the scraper elements may be configured as a profile which has a concave curvature which is inwardly directed. In order for the scraper elements themselves to be protected against food particles adhering thereto, said scraper elements preferably are kept comparatively small, such that the face lending itself to said adhesion likewise is small. Furthermore, protruding edges which reduce or avoid surface adhesion may be incorporated into the surface.

In the preferred design embodiment, the elastic lip is attached to a rigid scraper element or, alternatively, is part of this scraper element. For example, a rigid scraper element may be made from a plastic which is dimensionally stable at room temperature. These would include, for example, thermoplastics, for example polypropylene or a comparable material. In turn, the elastic lip is preferably made from a material which is elastic at room temperature; this may either be an elastomer or a thermoplastic elastomer (TPE).

In as far as the elastic lip and the further part of the scraper element are made from different materials, the former preferably are manufactured in the context of a multi-component injection molding process. To this end, the basic element of the scraper element, namely the rigid support region, is initially manufactured in a first injection-molding step. Once the injected material has (partially) solidified, the elastic material is then injected in order for the elastic lip to be manufactured, wherein the corresponding volume for this purpose may be vacated by retracting or removing an inserted mold element, for example.

Otherwise, in the case of a corresponding selection of the injection points, an elastic raw material may also be initially injected, wherein in the course of the injection operation the carrier material is injected, so that the flow front thereof drives the elastic material ahead of said flow front, such that said elastic material is backed up and solidifies at the point which later forms the elastic lip.

However, if in contrast the scraper element is made from a single material, the various functions of the individual regions (rigid or elastic) may be implemented by way of the respective wall thickness and/or shaping.

A food chopper of the type described herein usually has a plurality of scraper elements. For example, 3, 4, or 6 scraper elements are preferably provided, such that after removal of the lower side wall the remaining part of the food chopper can stand on the lower parts of the scraper elements which are configured so as to be foot-like, for example. The elastic lip may be configured so as to be linear and vertical; alternatively, however, a lip which runs along a curved helical line may also be provided.

Furthermore, a plurality of scraper lips which are disposed so as to be behind one another may also be provided on the scraper elements. In this way, for example a front lip may have a comparatively large spacing to the side wall or bear on the side wall with only a low force, while an elastic lip which is disposed therebehind presses against the inner wall of the side wall with a greater contact force, such that said elastic lip is capable of removing also small parts from the side wall which adhere thereto in a firm manner.

As is the case with generic food choppers, the tappet by way of which the chopping blade assembly is depressed protrudes vertically upward from the upper part of the housing by way of a shaft, wherein the hand rest by way of which the user can manually depress the tappet is disposed on the end of the shaft. In order for such a food chopper to be able to be stored in a simpler manner, a locking feature which is capable of retaining the shaft or the tappet, respectively, in a depressed state is preferably provided. On account thereof it is avoided that the tappet protrudes unnecessarily far from the housing and thus requires a large cupboard compartment, for example.

According to a further aspect of the invention, which may also be employed so as to be independent of the aforedescribed properties of the elastic lip, the locking feature is preferably formed by a rotary knob which inwardly extends into the housing and, in order to lock the tappet, in a corresponding rotational position is capable of engaging behind a counter-bearing edge of the tappet or of the chopping blade assembly such that the tappet, driven by the restoring force of the spring, cannot bounce back again in an upward manner. To this end, the shaft may for example have a transversely running groove into which an inner part of the rotary knob is rotated when the latter is rotated, such that said locking is performed.

The rotary head is mounted in a receptacle which is provided on a central housing part, for example, wherein the two foldable housing halves are also mounted on the central housing part. This mounting may be of a sleeve type, for example, and extend horizontally in a perpendicular manner to the tappet axis. In this case, the rotary knob has for example a lock bar, which inwardly protrudes and on the end of which a pawl is provided, which is displaced by rotation of the rotary knob, wherein on the tappet or the shaft at least one edge is provided which in a suitable position of the tappet or shaft is disposed in such a manner that the lock bar, after having been displaced by the rotary knob, engages from behind with this edge from above and prevents the tappet springing back.

In one preferred design embodiment the shaft or the tappet has at least two such edges, such that the rotary knob may block the shaft or the tappet in two positions. This, for one, may be a storage position in which the shaft or the tappet is pushed in very far, for example so far that the chopping blade assembly almost touches the base or the lower cover. This position has the advantage that the shaft or the tappet does not protrude far from the food chopper and thus occupies little space in the cupboard.

In the case of a cleaning position, the shaft or the tappet may also be blocked in another position.

Furthermore, in a further design embodiment of the invention the rotary knob may also secure or release, respectively, the pivotable housing halves. In this design embodiment the rotary knob is twistable from a first extreme position to a second extreme position, wherein the housing halves are unlocked in the first extreme position. Rotating the rotary knob in one direction then has the effect that the rotary knob arrests the housing halves which are folded downward in that for example, said rotary knob, after initial rotation, by way of one retaining edge in each case engages from behind in one counter-bearing edge of the housing halves along which the retaining edge is then displaceable in the event of further rotation.

The rotary knob is then displaceable into an operating position in which the former releases the shaft or the tappet and simultaneously keeps together the closed housing halves. Further rotation of the rotary knob in the case of a depressed tappet may then secure the latter in the storage position described above. The individual positions of the rotary knob may be identifiable by way of latching means, and the rotary knob may at the same time be held in this position by way thereof.

Further aspects of an advantageous food chopper, which may also be independent of the above-described features, include the provision of a storage container which is integrated in the chopper. To this end, the side wall of the operating space may be removable, as is the case in the known choppers, wherein the lower region of this side wall is closable by way of a cover-like base which is placeable thereonto. The storage pot thus formed may then be completely closed by way of an additional cover which is placeable onto the upper periphery of the side wall, such that the chopped food can then be stored by way of this container. After having chopped an onion, for example, leftovers which are not required may be kept cold.

The additional cover which is placeable onto the upper periphery may either be integrated in the lower cover, such that both parts are placed inside one another and, if and when required, can be separated from one another. To this end, one of the two covers may have a receptacle into which the other cover may be inserted in a latching manner.

Alternatively, the receptacle may also be configured in such a manner that for closing the upper periphery of the of the side wall the additional cover may also be fastened on another component of the food chopper, the hand rest in the region of the tappet particularly lending itself to this purpose.

A damping feature of the tappet for when the blades of the chopping blade assembly reaches the counter-bearing face or the food, respectively, is a further advantageous aspect of a food chopper. To this end, the tappet may either be resiliently mounted on the hand rest or be configured in the manner of a telescopic rod, wherein the telescopic function is then implemented so as to be counter to a spring force, such that the shaft of the tappet can only be collapsed by overcoming the spring force and, in the event of a relief, automatically again assumes the original length.

Alternatively, the resilient function for damping may also be implemented by way of a pad-like application on the hand rest or by way of a pad-like configuration of said hand rest.

In all cases the effect of the recoil is reduced by the damping, such that, on the one hand, the food chopper is more comfortable to operate and, on the other hand, a limitation of force or a limitation which prevents the blades of the chopping blade assembly being damaged or being able to damage the counter-bearing face is implemented.

Figure 1:
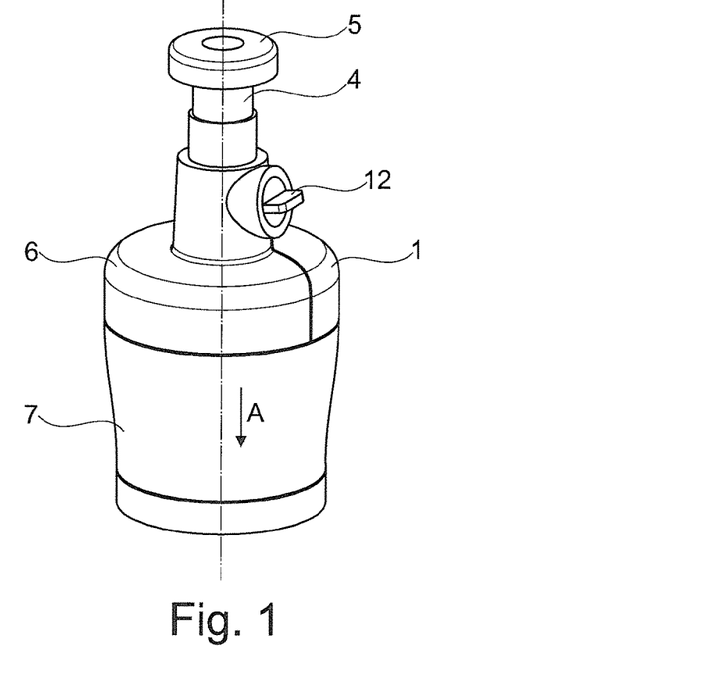
FIG. 1 shows a three-dimensional illustration of a food chopper according to an embodiment of the invention.

A food chopper according to an embodiment of the invention is reproduced in a three-dimensional illustration in FIG. 1. The chopper has a housing 1 which has an upper receptacle space 6 for a chopping blade assembly 2 and an operating space 7 lying therebelow.

By way of a tappet 4 the chopping blade assembly 2 can be driven from the receptacle space 6 downward into the operating space 7, until the former contacts the counter-bearing face 3 while cutting the food which is disposed in the operating space 7. In the illustrated case the lower region as a protection against injury is closed by way of a cover-like base, the food chopper illustrated here thus being in the storage position in which it may be stashed in the kitchen cupboard.

In order for the tappet 4 to be able to be depressed a hand rest 5 is provided in the upper region. The tappet 4 which here is illustrated in the depressed position is arrested by way of a rotary knob 12, such that the former cannot recoil upward.

Figure 2:
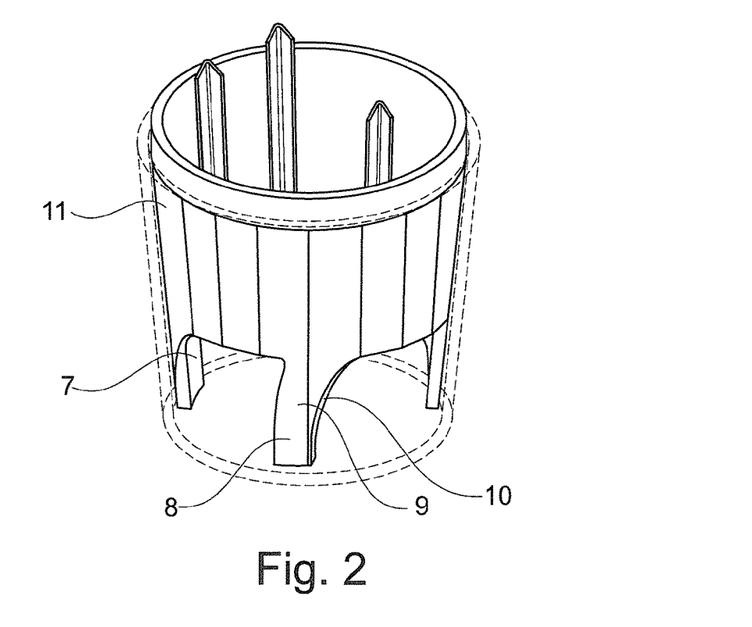
FIG. 2 shows the lower part of the food chopper illustrated in FIG. 1.

Likewise in a three-dimensional illustration, FIG. 2 shows the lower region of the food chopper illustrated in FIG. 1. Here the operating space 7, which is substantially composed of a cylindrical transparent side wall, is illustrated. Of course, this wall is open in the lower region, since the chopper is placed onto the food to be chopped here. As a protection against injury the lower cover-like base which is illustrated in FIG. 1 may be placed onto the food chopper when the latter is not in use.

The component which supports the scraper elements 8 and which here likewise is configured as a cylindrical support 11 is illustrated within the cylindrical side wall of the operating space 7. The scraper elements 8 extend downward in the direction of the base or of the counter-bearing face 3, respectively, and on their right peripheries have scraper edges 9 on the outer periphery of which in turn in each case one elastic lip 10, which lifts off the food particles from the inner side wall of the operating space 7 and supplies them again to further processing, is disposed.

Three mandrels extend upward from the support 11 here, by way of which the support 11 is connected in a rotationally fixed manner to the part of the housing 1 which rotates together with the chopping blade assembly 2 during the stroke movement. Alternatively, the support 11 may also be rotated byway of the chopping blade assembly 2. On its lower side, which here is unidentifiable and from which in the outer peripheral region the scraper elements 8 extend downward, the support 11 indeed has a circular base plate which in turn has passage gaps for the blades of the chopping blade assembly 2. Since the blades of the chopping blade assembly 2 rotate according to their function, they could by way of the engagement with the passage gaps also rotate the support 11 and thus the scraper elements 8.

A further advantageous design embodiment comprises lip seals which likewise seal the abovementioned passage gaps of the support 11. In particular when the support 11 is manufactured by an injection molding process using multi-component technology, this may be implemented in an easy and simple manner. If the elastic lips 10 of an elastic material are indeed molded on in the context of two-component technology, the seal of the passage gaps can also be manufactured in the same method step.

Figure 3:
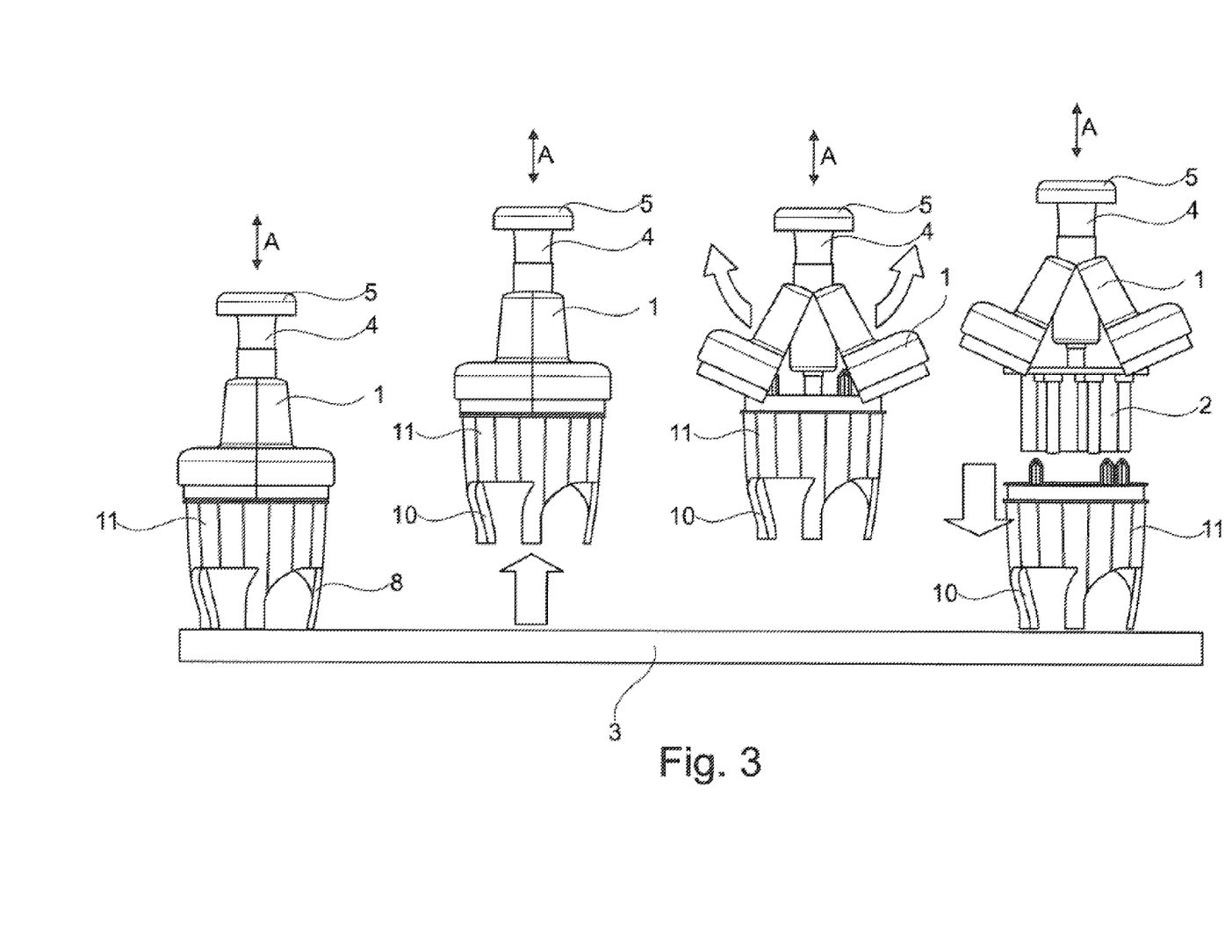
FIG. 3 shows the upper part of the food chopper illustrated in FIG. 1, in the various positions for cleaning.

The housing 1 of the food chopper according to the invention is illustrated in FIG. 3 in four different stages of disassembly for cleaning purposes. The illustration on the left shows the food chopper without the cylindrical side wall which forms the operating space 7.

Figure 6:
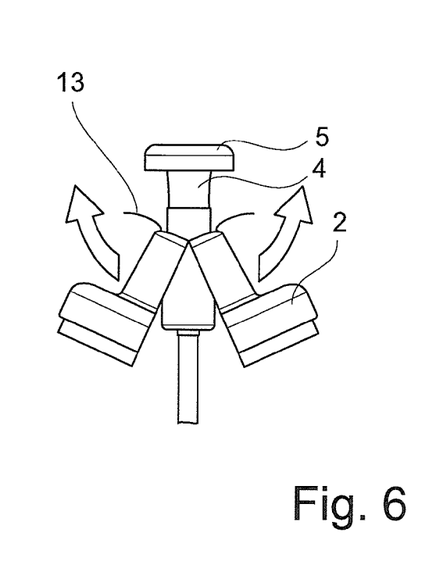
FIG. 6 shows a detail of the upper housing halves having wings for gripping the two housing halves.

The housing 1 which is configured in two parts, as is illustrated in the third illustration (seen from left to right), can be laterally folded out in an upward manner for cleaning purposes. To this end, the two housing halves are pivotably interconnected about an axis which is perpendicular to the operating direction and to the paper plane and between them enclose the shaft of the tappet 4 in the region of this pivotable connection. Wings 13, which laterally corbel outward, may be provided on the two upper ends of the housing halves, such that the user whose palm of his/her hand lies on the hand rest 5 can grip and pull up in each case one wing 13 with two fingers. As is illustrated in the figure on the right, with his/her other hand the user can then pull the support 11 from the chopping blade assembly 2 and clean the entire mechanism in the folded-out state under running water. The wings 13 are shown in a detail drawing in FIG. 6.

Figure 4:
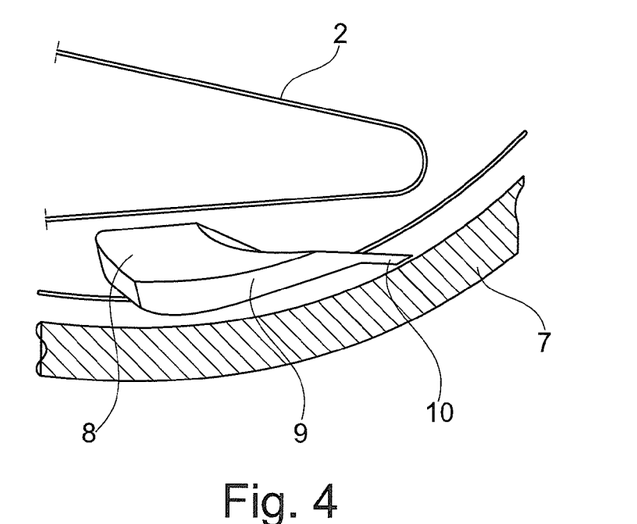
FIG. 4 shows a scraper element made from a uniform material, in an enlarged illustration.
Figure 5:
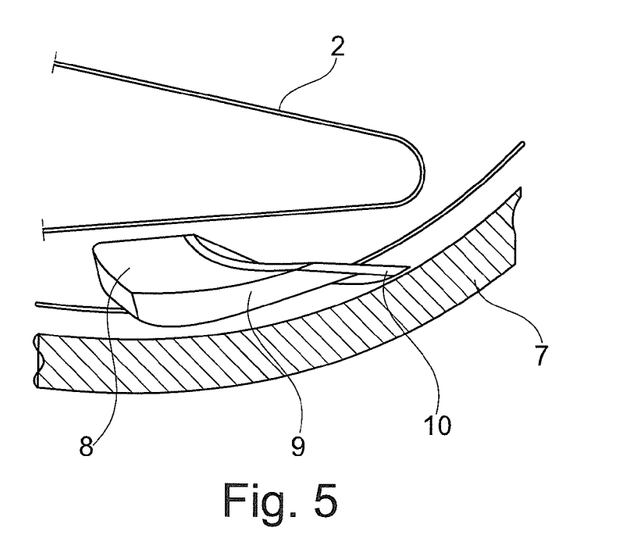
FIG. 5 shows an alternative scraper element made from two different materials.

A potential embodiment of the elastic lip 10 is illustrated in FIG. 4. This elastic lip 10 is manufactured from the same material as the scraper edge 9 of the scraper element 8. FIG. 5 shows a similar design embodiment, however here the elastic lip 10 is made by way of two-component technology from a softer second material, such that said elastic lip 10 can better adapt to the inner side of the cylindrical side wall of the operating space 7.

Figure 7:
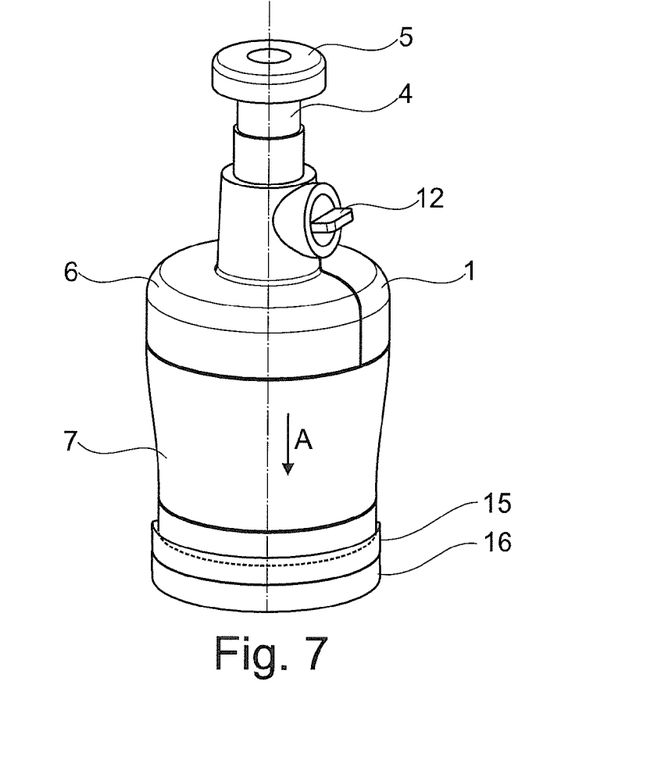
FIG. 7 shows a side view of a food chopper having an additional cover.

A variant of the food chopper which has a lower cover 15, onto which in turn an additional cover 16 is placed from below, is illustrated in FIG. 7. The latter may be placed onto the upper periphery of the side wall once the side wall has been removed from the upper part of the food chopper, in order to in this way obtain a closable container for chopped goods.

Figure 8:
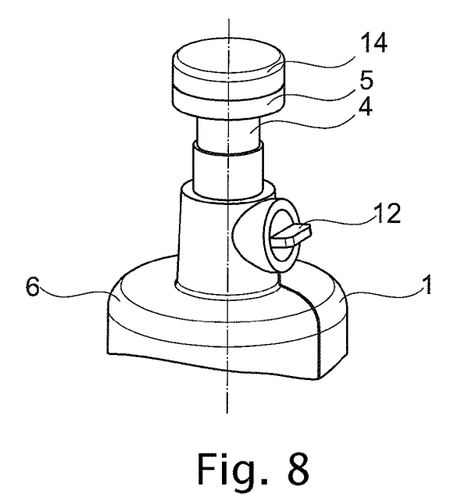
FIG. 8 shows upper part of a tappet having an elastic pressure pad.

FIG. 8 shows an upper plunger on the end of the tappet 4 which has an elastic pressure pad 14. The latter damps the jolt during chopping and thus renders this activity more comfortable.

Figure 9:
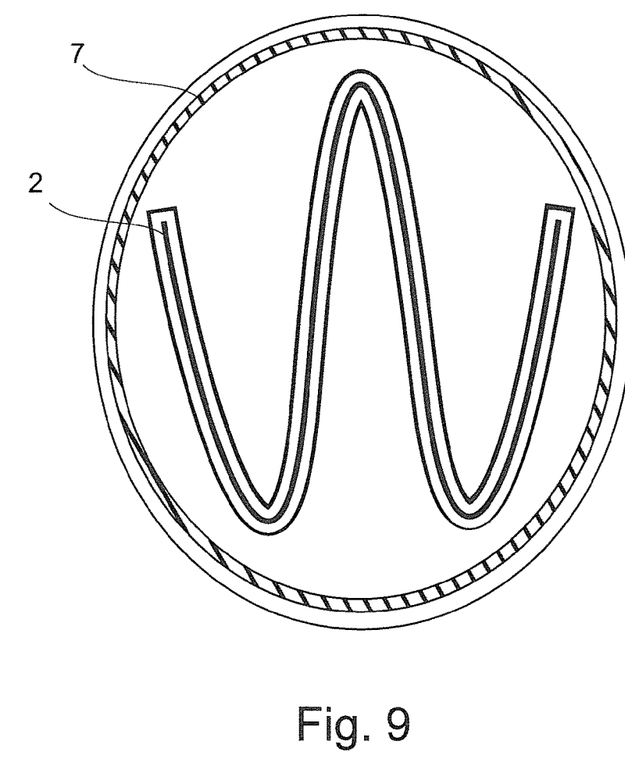
FIG. 9 shows a potential chopping blade assembly from below.

FIG. 9 shows the chopping blade assembly from below, here having a meandering profile of the chopping blades which is illustrated in an exemplary manner.

The present invention comprises a plurality of aspects which are formed, in particular, by the elastic lip 10, making the latter by way of two-component technology, the arresting function of the tappet 4, the drive of the scraper elements 8, and of the resilient function, in particular by way of the elastic region of the hand rest 5. All these aspects are employable so as to be independent from one another in order to improve the known food choppers, such that the applicant reserves the right of separately claiming these components without the features of claim 1 in the context of part-applications.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Housing
2 Chopping blade assembly
3 Counter-bearing face
4 Tappet
5 Hand rest
6 Receptacle space
7 Operating space
8 Scraper element
9 Scraper edge
10 Elastic lip
11 Support
12 Rotary knob
13 Wing
14 Pressure pad
15 Lower cover
16 Additional cover
A Operating direction

The invention claimed is:

1. A food chopper, comprising:
a housing having a guide, an upper receptacle space and a lower operating space that is delimited by a side wall and is configured to receive food to be chopped;
a chopping blade assembly disposed in the housing, the chopping blade assembly being configured to be disposed, in an upper rest position, in the upper receptacle space of the housing, the chopping blade assembly being held and guided in the guide of the housing so as to be movable to-and-fro along an operating direction counter to a force of a return spring in such a manner that the chopping blade assembly, during movement along the operating direction, is forcibly rotated and held in the upper rest position by the return spring and, in order to chop the food, is movable from the upper rest position downward against a counter-bearing face;
a tappet protruding from the housing and being configured to depress the chopping blade assembly, the tappet having a hand rest and interacting with the chopping blade assembly; and
at least one scraper element configured to be driven by rotational movement of the chopping blade assembly such that a scraper edge of the at least one scraper element is moved along an inner side of the side wall of the lower operating space, the scraper edge having an elastic lip which is configured, during rotational movement of the scraper element, to bear on the inner side of the side wall,
wherein the scraper element has a rigid support region which protrudes downward into the lower operating space, and an elastic rubbing region which extends from the rigid support region laterally to the side wall and which forms the elastic lip,
wherein the rigid support region and the rubbing region are formed from different materials, the rigid support region being formed from a material which is rigid at room temperature, and the rubbing region being formed from a material which is elastic at room temperature.

2. The food chopper recited in claim 1, wherein the at least one scraper element is three or more scraper elements, the scraper elements being disposed on a common support which is penetrated by the chopping blade assembly and is rotatably driven in a direction which is radial to the operating direction by the rotational movement of the chopping blade assembly.

3. The food chopper recited in claim 1, wherein the at least one scraper element has a support which has a gap adapted in a course of a knife blade of the chopping blade assembly, the chopping blade assembly penetrating the support, and wherein elastic scraping lips are disposed at the gap and are configured to elastically bear on the knife blade to scrape food remnants from the knife blade.

4. The food chopper recited in claim 1, wherein the housing has two housing parts which are interconnected so as to be pivotable about a pivot axis which is perpendicular to the operating direction, the housing parts extending downward from the pivot axis and, in a folded-up state, delimit the upper receptacle space, the housing parts being foldable out for cleaning, and wherein laterally deploying wings are disposed on the housing parts, the laterally deploying wings being dimensioned and positioned in such a manner that a user pushing down with the tappet with a palm is able to grip the laterally deploying wings with fingers and pull the laterally deploying wings up in order to fold out the housing.

5. The food chopper recited in claim 1, wherein the elastic lip is curved.

6. The food chopper recited in claim 1, wherein the tappet by way of a shaft protrudes upward from the housing and has a pressure plate which is connected to the shaft, as well as an annular side wall which extends downward from the pressure plate.

7. The food chopper as recited in claim 1, wherein the tappet by way of a shaft protrudes upward from the housing, and wherein the shaft is configured so as to be elastic by at least one of having a spring which acts in the operating direction or being made from an elastic material.

8. The food chopper recited in claim 1, wherein the tappet has an upper hand rest in a form of a pressure pad, which is manufactured from an elastomer which is elastic at room temperature or a thermoplastic elastomer.

9. The food chopper recited in claim 1, wherein the tappet by way of a shaft protrudes upward from the housing, the shaft is configured so as to be elastic by at least one of having a spring which acts in the operating direction or being made from an elastic material, and the tappet has an upper hand rest in a form of a pressure pad, which is manufactured from an elastomer which is elastic at room temperature or a thermoplastic elastomer.

10. The food chopper recited in claim 1, wherein the chopping blade assembly has a blade carrier and at least one chopping blade which is linear or curved in a meandering shape, the at least one chopping blade extending downward from said blade carrier and, in the operating direction, being connected to the blade carrier in a shock-absorbing manner.

11. The food chopper recited in claim 1, wherein the side wall of the lower operating space is removably connected to the housing and the at least one scraper element is three scraper elements, lower ends of the scraper elements having feet regions by way of which the food chopper is placeable on a subsurface in a state of the food chopper in which the side wall has been removed.

12. The food chopper recited in claim 1, wherein:
the side wall of the lower operating space is removably connected to the housing and the at least one scraper element is three scraper elements, lower ends of the scraper elements having feet regions by way of which the food chopper is placeable on a subsurface in a state of the food chopper in which the side wall has been removed;
the food chopper comprises a lower cover which is placeable in a latching manner onto a lower periphery of the side wall; and
the lower cover has a removable additional cover which, after removal of the side wall, is elastically placeable onto an upper periphery of the side wall.

13. The food chopper recited in claim 1, further comprising a lower cover which is placeable in a latching manner onto a lower periphery of the side wall, and an additional cover which is elastically placeable onto an upper periphery of the side wall and which has a latching receptacle by way of which, in an unused state, the additional cover is connectable to the tappet.

14. The food chopper recited in claim 1, further comprising a lower cover which is placeable in a latching manner onto a lower periphery of the side wall, and an additional cover which is elastically placeable onto an upper periphery of the side wall and which has a latching receptacle by way of which, in an unused state, the additional cover is connectable to the tappet, wherein the upper periphery of the side wall has a diameter which is different from that of the lower periphery of the side wall, and wherein the additional cover is held in a receptacle which is accessible from below in a lower side of the lower cover.

15. The food chopper recited in claim 8, wherein the tappet by way of a shaft protrudes upward from the housing and has a pressure plate which is connected to the shaft, and wherein the pressure pad is removably connected to the pressure plate.

16. A food chopper, comprising:
a housing having a guide, an upper receptacle space and a lower operating space that is delimited by a side wall and configured to receive food to be chopped;
a chopping blade assembly disposed in the housing, the chopping blade assembly being configured to be disposed, in an upper rest position, in the upper receptacle space of the housing, the chopping blade assembly being held and guided in the guide of the housing so as to be movable to-and-fro along an operating direction counter to a force of a return spring in such a manner that the chopping blade assembly, during movement along the operating direction, is forcibly rotated and held in the upper rest position by the return spring and, in order to chop the food, is movable from the upper rest position downward against a counter-bearing face;

a tappet protruding from the housing and being configured to depress the chopping blade assembly, the tappet having a hand rest and interacting with the chopping blade assembly; and at least one scraper element configured to be driven by rotational movement of the chopping blade assembly such that a scraper edge of the at least one scraper element is moved along an inner side of the side wall of the lower operating space, wherein the chopping blade assembly, in a depressed storage position, is arrestable by way of a locking feature formed by a rotary head which, in a closing position, is configured to engage from behind with a retaining edge which is connected to the tappet or to the chopping blade assembly and, by way of rotation, is disengageable with the retaining edge, wherein the scraper element has a rigid support region which protrudes downward into the lower operating space, and an elastic rubbing region which extends from the rigid support region laterally to the side wall and which forms an elastic lip, wherein the rigid support region and the rubbing region are formed from different materials, the rigid support region being formed from a material which is rigid at room temperature, and the rubbing region being formed from a material which is elastic at room temperature.

17. The food chopper recited in claim 16, wherein the elastic lip, during rotational movement of the scraper element, hears on the inner side of the side wall.

18. A food chopper, comprising:

a housing having a guide, an upper receptacle space and a lower operating space that is delimited by a side wall and configured to receive food to be chopped;

a chopping blade assembly disposed in the housing, the chopping blade assembly being configured to be disposed, in an upper rest position, in the upper receptacle space of the housing, the chopping blade assembly being held and guided in a guide of the housing so as to be movable to-and-fro along an operating direction counter to a force of a return spring in such a manner that the chopping blade assembly, during movement along the operating direction, is forcibly rotated and held in the upper rest position by the return spring and, in order to chop the food, is movable from the upper rest position downward against a counter-bearing face;

a tappet protruding from the housing and being configured to depress the chopping blade assembly, the tappet having a hand rest and interacting with the chopping blade assembly; and at least one scraper element configured to be driven by rotational movement of the chopping blade assembly such that a scraper edge of the at least one scraper element is moved along an inner side of the side wall of the lower operating space, wherein the housing the housing has two housing parts which are interconnected so as to be pivotable about a pivot axis which is perpendicular to the operating direction, the housing parts extending downward from the pivot axis and, in a folded-up state, delimit the upper receptacle space, the housing parts being foldable out for cleaning, and wherein laterally deploying wings are disposed on the housing parts, the laterally deploying wings being dimensioned and positioned in such a manner that a user pushing down with the tappet with a palm is able to grip the laterally deploying wings with fingers and pull the laterally deploying wings up in order to fold out the housing, and wherein the chopping blade assembly, in a depressed storage position, is arrestable by way of a locking feature formed by a rotary head which, in a closing position, is configured to engage from behind with a retaining edge which is connected to the tappet or to the chopping blade assembly and, by way of rotation, is disengageable with the retaining edge, wherein the scraper element has a rigid support region which protrudes downward into the lower operating space, and an elastic rubbing region which extends from the rigid support region laterally to the side wall and which forms an elastic lip, wherein the rigid support region and the rubbing region are formed from different materials, the rigid support region being formed from a material which is rigid at room temperature, and the rubbing region being formed from a material which is elastic at room temperature.

19. The food chopper recited in claim 18, Wherein the elastic lip, during rotational movement of the scraper element, bears on the inner side of the side wall.

* * * * *